United States Patent [19]
Lee

[11] Patent Number: 5,980,425
[45] Date of Patent: *Nov. 9, 1999

[54] HYDRAULIC CONTROL SYSTEM FOR AN AUTOMATIC TRANSMISSION

[75] Inventor: Jinsoo Lee, Seoul, Rep. of Korea

[73] Assignee: Hyundai Motor Co., Seoul, Rep. of Korea

[*] Notice: This patent is subject to a terminal disclaimer.

[21] Appl. No.: 08/974,310

[22] Filed: Nov. 19, 1997

[30] Foreign Application Priority Data

Nov. 19, 1996 [KR] Rep. of Korea ....................... 96-55078

[51] Int. Cl.$^6$ ........................... F16H 57/08; F16H 59/48; F16H 61/26
[52] U.S. Cl. ........................... 477/127; 477/120; 475/158
[58] Field of Search ..................................... 475/156, 158, 475/159, 160; 477/118, 127, 120, 122, 130

[56] References Cited

U.S. PATENT DOCUMENTS 5,542,888  8/1996  Takada et al. ....................... 477/158 X
5,643,123  7/1997  Jang et al. ........................... 475/120 X

*Primary Examiner*—Charles A. Marmor
*Assistant Examiner*—Roger Pang

[57] ABSTRACT

Disclosed is a hydraulic control system for an automatic transmission which includes a line pressure controller for regulating hydraulic pressure generated by a hydraulic pump to line pressure, a damper clutch controller for actuating a damper clutch of the torque converter, a reducing pressure controller for reducing line pressure, a range controller for selectively supplying line pressure to lines corresponding to respective shift ranges, a shift controller for supplying hydraulic pressure from the range controller to lines corresponding to respective shift ranges, a hydraulic pressure controller for converting hydraulic pressure from the range controller to operational pressure operating the friction element, and a hydraulic pressure distributor for determining a hydraulic flow path corresponding to each shift range by operating valves according to the hydraulic pressure from the shift controller, and suitably distributing the operational pressure to each friction element, wherein the shift controller further includes an additional shift control valve easily controlling timing of pressure supply and reducing a change in hydraulic pressure levels.

12 Claims, 8 Drawing Sheets

HYDRAULIC CONTROL SYSTEM FOR AN AUTOMATIC TRANSMISSION

FIELD OF THE INVENTION

The present invention relates to a hydraulic control system for a four-speed automatic transmission, and more particularly, to a hydraulic control system for automatic transmission in which hydraulic pressure supplied to friction elements is controlled by solenoid valves to improve shift response and shift quality.

BACKGROUND OF THE INVENTION

Generally, a conventional automatic transmission for a vehicle includes a torque converter, a multi-stage gear shift mechanism connected to the torque converter, and a plurality of friction elements actuated by hydraulic pressure for selecting a gear stage of the gear shift mechanism.

In such hydraulic control system, hydraulic pressure generated by a hydraulic pump is selectively supplied to each friction element by a plurality of control valves such that automatic shifting is realized in accordance with a driving state of the vehicle and engine throttle opening.

The above hydraulic control system generally comprises a line pressure controller for regulating hydraulic pressure generated by the hydraulic pump to line pressure, a damper clutch controller for actuating a damper clutch of the torque converter, a reducing pressure controller for reducing line pressure, a range controller for selectively supplying line pressure to lines corresponding to respective shift ranges, a shift controller for supplying hydraulic pressure from the range controller to lines corresponding to respective shift ranges, a hydraulic pressure controller for converting hydraulic pressure from the range controller to operational pressure operating the friction element, and a hydraulic pressure distributor for determining a hydraulic flow path corresponding to each shift range by operating valves according to the hydraulic pressure from the shift controller, and suitably distributing the operational pressure to each friction element.

The shift controller operates spool valves of the hydraulic pressure distributor according to a transmission control unit such that determines the hydraulic flow path corresponding to each shift range to realize shifting.

When changing shift stages, the timing of exhausting hydraulic pressure from one set of friction elements and supplying hydraulic pressure to another set of friction elements through the hydraulic flow path determined by the shift controller in accordance with each shift range and a change in hydraulic pressure levels in the hydraulic flow path greatly influences shift quality and durability of the automatic transmission. This mis-timing can also cause an abrupt increase in engine revolutions or locking of the shift mechanism and a change in hydraulic pressure levels decreases durability of the automatic transmission.

In order to improve shift quality and durability of the transmission by accurately controlling the timing of pressure supply and reducing a change in hydraulic pressure levels, a method of modifying shift valve structure has been developed. However, such a method complicates both the structure of the shift valves and the control process.

SUMMARY OF THE INVENTION

The present invention has been made in an effort to solve the above problems. It is an object of the present invention to provide a hydraulic control system used in automatic transmissions for a vehicle, which easily and accurately controls timing of pressure supply to and reduces a change in hydraulic pressure levels flowing in a flow path.

To achieve the above object, the present invention provides a hydraulic control system for an automatic transmission including a plurality of friction elements associated with respective transmission speeds, the hydraulic control system comprising:

a hydraulic fluid source;

a line pressure controller for regulating hydraulic pressure from the fluid source to line pressure;

a damper clutch controller for supplying or exhausting the hydraulic pressure from the line pressure controller to a damper clutch, a torque converter and each lubricating part;

reducing pressure controller for reducing hydraulic pressure from the line pressure controller;

a range controller for selectively supplying hydraulic pressure from the line pressure controller to lines corresponding to respective shift ranges in accordance with a position of a shift lever;

a shift controller for supplying hydraulic pressure from the range controller to lines corresponding to respective shift ranges by control of a transmission control unit, said shift controller having a first shift control valve for controlling the hydraulic pressure from the range controller to second, third, and fourth speed pressures;

a hydraulic pressure controller for converting hydraulic pressure from the range controller to operational pressure operating the friction elements;

a hydraulic pressure distributor for determining a hydraulic flow path corresponding to each shift range by operating valves according to the hydraulic pressure from the shift controller, and suitably distributing the operational pressure to each friction element:

wherein the shift controller further comprise;

a second shift control valve for additionally supplying the hydraulic pressure from the range controller to the hydraulic distributor to control timing when hydraulic pressure is provided from the hydraulic distributor to each friction element; and a solenoid valve for controlling the second shift control valve in accordance with transmission control unit control.

BRIEF DESCRIPTION OF THE DRAWINGS

These and other features, aspects, and advantages of the present invention will become better understood with regard to the following description, appended claims, and accompanying drawings where:

DETAILED DESCRIPTION OF PREFERRED EMBODIMENTS

Figure 1:
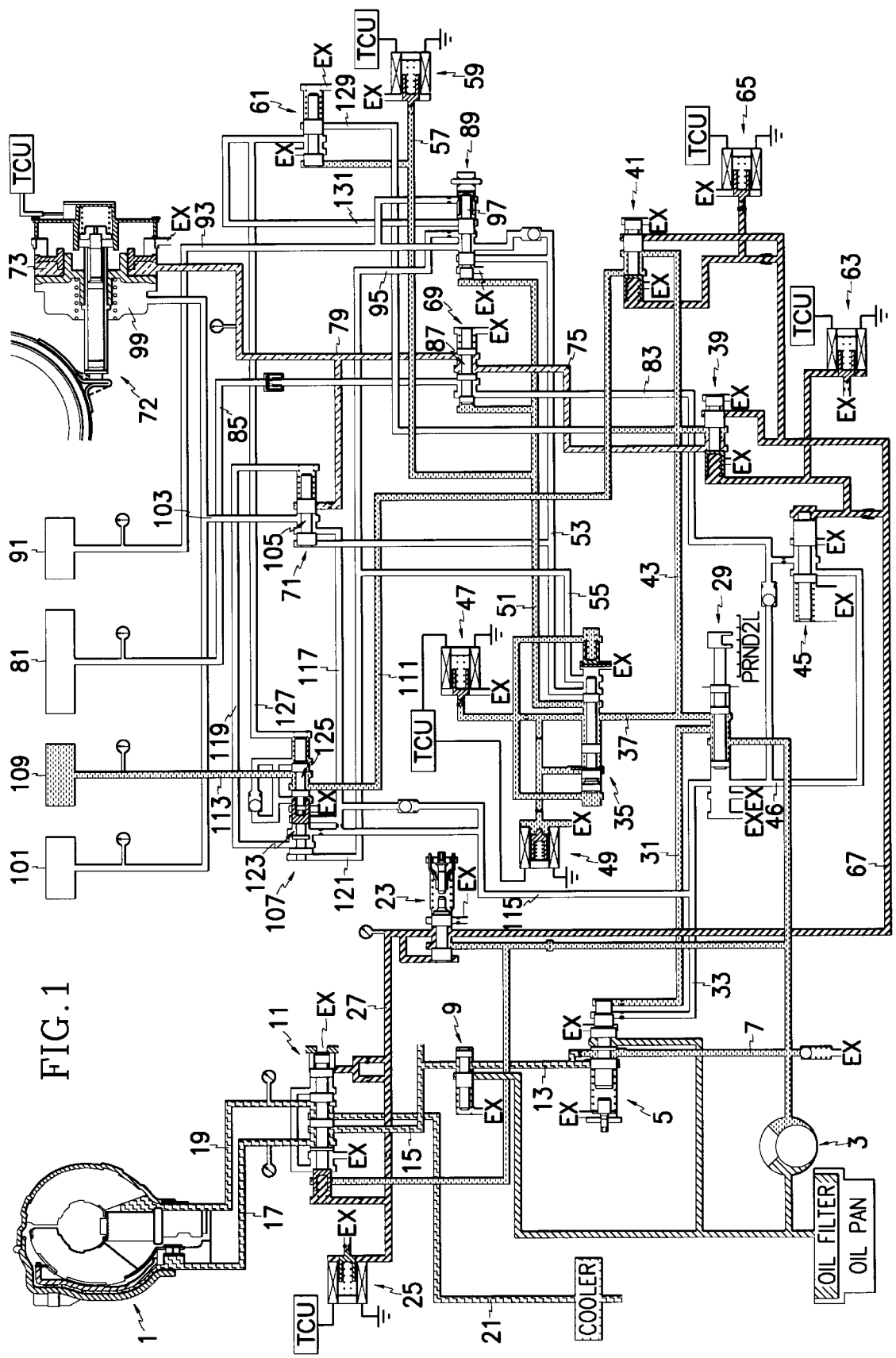
FIG. 1 is a hydraulic circuit diagram showing hydraulic pressure flow during 1-2 shift process of a hydraulic control system according to a preferred embodiment of the present invention.

Reference will now be made in detail to the present preferred embodiment of the invention, an example of which is illustrated in the accompanying drawings. Wherever possible, the same reference numbers will be used throughout the drawings to refer to the same or like parts.

Certain terminology will be used in the following description for convenience and reference only and will not be limiting. The words "right" and "left" will designate directions in the drawings to which reference is made.

Referring first to FIG. 1, there is shown a hydraulic circuit diagram showing hydraulic pressure flow during 1-2 shift process of a hydraulic control system according to the present invention. The hydraulic control system is structured such that hydraulic pressure created by an hydraulic pressure generator means is supplied to/released from each friction element to engage/disengage the same, realizing automatic shifting.

In more detail, an oil pump 3, mounted to a pump drive hub of a torque converter 1, is connected to a line pressure passage 7 to enable supply of hydraulic pressure to a regulator valve 5.

The regulator valve 5 supplies hydraulic pressure supplied through the line pressure passage 7 to a torque converter control valve 9, a damper clutch control valve 11, and the torque converter 1 through lines 13,15,17,19, and 21 such that lubrication of a transaxle and a damper clutch, mounted in the torque converter 1, are able to be controlled.

A reducing valve 23, connected to the line pressure passage 7 receiving line pressure controlled in the regulator valve 5, is connected to a line 27 such that reduced pressure can be supplied to a damper clutch control solenoid valve 25, controlling the damper clutch according to signals from a transmission control unit (TCU).

Hydraulic pressure in the line pressure passage 7 is supplied to the torque converter 1 through the damper clutch control valve 11, the damper clutch control valve 11 being controlled by the damper clutch control solenoid valve 25.

Further, the line pressure passage 7 is connected to a manual valve 29, indexed by a shift select lever (not shown) to determine shift ranges by controlling hydraulic flow, shift ranges of the manual valve 29 including parking P, reverse R, neutral N, and drive D, 2, and L ranges.

The manual valve 29 enables supply of hydraulic pressure to a regulator valve 5 when drive and reverse, D,2,L and R ranges are selected, and is connected to lines 31 and 33 to enable control of hydraulic pressure to suitable line pressure levels for each range.

In addition, the manual valve 29 is connected to a first shift control valve 35 via a line 37, to first and second pressure control valves 39 and 41 via a line 43, and an N-R control valve 45 via a line 46 to allow the supply and exhaust of hydraulic pressure to and from elements controlling shifting and hydraulic pressure.

The first shift control valve 35 supplies/exhausts second, third, and fourth speed pressures respectively to second, third, and fourth speed lines 51, 53, and 55 by first and second shift control solenoid valves 47 and 49 ON/OFF operated according to control signals from the TCU.

A second shift control valve 61, controlled by a third shift control solenoid valve 59, is connected to a line 57 extended from the second speed pressure line 51.

The first and second hydraulic pressure control valves 39 and 41 and the N-R control valve 45 are connected to a line 67 to allow supply of reduced pressure from the reducing valve 23, and control by the pressure control solenoid valve 63.

A hydraulic pressure distributor is provided between friction elements and a hydraulic pressure controller comprising the hydraulic pressure control valves 39 and 41 and N-R control valve 45. The hydraulic pressure distributor is controlled by the first and second shift control valves 35 and 61, and supplies suitable levels of hydraulic pressure to friction elements for each shift range.

The hydraulic pressure distributor comprises a 1-2 shift valve 69, a 2-3/4-3 shift valve 71, and end-clutch valve 89, and a rear clutch valve 107. The 1-2 shift valve 69 is connected to the second speed pressure line 51 to be controlled by pressure from the same, to lines 83 and 85 to allow supply of hydraulic pressure supplied from the first pressure control valve 39 to a 2-3/4-3 shift valve 71 and a servo apply 73 of a kickdown band brake 72, and to lines 83 and 85 such that hydraulic pressure from the N-R control valve 45 is fed to a low-reverse brake 81. The 1-2 shift valve 67 includes a valve spool 87 to enable the above port-conversion control.

The end clutch valve 89 is connected to the second and third speed lines 51 and 53 to be controlled by second speed pressure. Also, connected to the end clutch valve 89 are a line 93 for supply/release of third speed pressure from an end clutch 91, and a line branched off from the fourth speed line 55. A valve spool 97 is disposed in the end clutch valve 89 enabling the supply of pressure to the line 93 as fail-safe means.

The 2-3/4-3 shift valve 71 is connected to the third speed line 53 to be controlled by pressure from the same, and to a line 103 such that hydraulic pressure supplied to the line 79 is fed to a servo release 99 of the kickdown band brake 72 and a front clutch 101. The 2-3/4-3 shift valve 71 includes a valve spool 105 to enable the above control.

The rear clutch valve 107 is connected to lines 111 and 113 for supply of hydraulic pressure from the second hydraulic control valve 41 to a rear clutch 109, to lines 115,117 and 119 to supply hydraulic pressure from the manual valve 29 to the 2-3/4-3 shift valve 71 to provide the hydraulic pressure to a line 103, and to a line 121 branched off from the fourth speed line 55. The rear clutch valve 107 includes first and second valve spools 123 and 125 and enables hydraulic pressure supplied to the rear clutch 109 to be exhausted in a fourth speed of the drive D range.

Further, the rear clutch valve 107 is connected to the second shift control valve 61 via a line 127 such that hydraulic pressure supplied to the line 129 branched off from the line 43 is supplied to the second shift control valve 61 via the line 127 to enable control of the second valve spool 125 according to third shift control solenoid valve 59 control.

The second shift control valve 61 is connected a line 131 to enable the simultaneous control of the rear clutch valve 107 and the valve spool 97 of the end clutch valve 89.

The damper clutch control solenoid valve 25, first and second shift control solenoid valves 47 and 49, and the first and second pressure control solenoid valves 63 and 65 are normal close type solenoid valves and, therefore, pressure is controlled to high when the above valves are not activated.

However, the third shift control solenoid valve 59 is a normal open type solenoid valve such that pressure is controlled to low when the valve is not activated.

In the hydraulic control system structured as in the above, automatic shifting for the transmission is realized by the operation of the manual valve 29 and the ON/OFF and duty control of each solenoid valve by the TCU according to vehicle speed and throttle opening.

First, when an engine of the vehicle is started, hydraulic pressure generated by the oil pump 3 is controlled to a predetermined level in the regulator valve 5 then supplied to the line pressure passage 7 and, at the same time, to the torque converter control valve 9.

Also, the TCU performs control such that the reduced pressure supplied from the reducing valve 23 is operated/non-operated by ON/OFF controlling the damper clutch control solenoid valve 25 to control the damper clutch control valve 11, and engages/disengages the damper clutch by supplying/exhausting hydraulic pressure to/from the lines 17 and 19.

(1-2 Shifting)

Referring to FIG. 1, shown is a hydraulic circuit diagram during 1-2 shifting of a hydraulic control system according to a preferred embodiment of the present invention. When the manual valve 29 is positioned at the drive D range and vehicle speed and throttle opening are increased in the first speed of the drive D range, control is realized as shown in FIG. 1.

In a state where the rear clutch 109 is operating, the TCU controls the first, second and third shift control solenoid valves 47, 49 and 59 such that hydraulic pressure is supplied from the first shift control valve 35 to the second speed pressure line 51.

The hydraulic pressure supplied from the second speed pressure line 51 is fed to the 1-2 shift valve 69 such that the valve spool 87 of the same is moved to the right to communicate the lines 75 and 79.

Simultaneously with the above, the TCU duty controls the pressure control solenoid valve 63 to operate the first pressure control valve 39. As a result, hydraulic pressure supplied to the line 43 is duty controlled and supplied to the servo apply 73 through the lines 75 and 79 to operate the kickdown band brake 72, realizing shifting into the second speed of the drive D range.

(2-3 Shifting)

Figure 2:
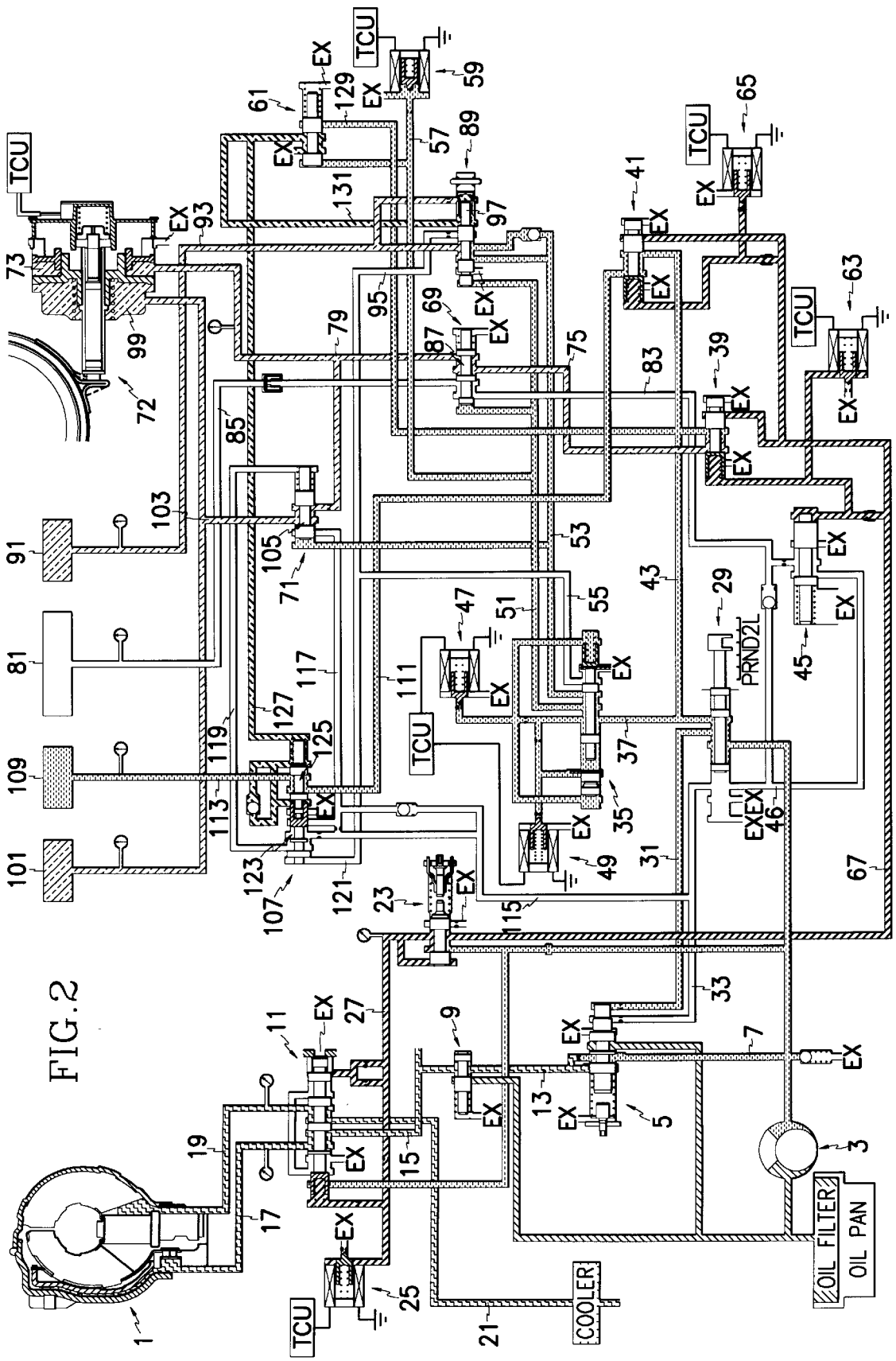
FIG. 2. is a hydraulic circuit diagram showing hydraulic pressure flow during 2-3 shift process of a hydraulic control system according to a preferred embodiment of the present invention.

If vehicle speed and throttle opening are increased in the second speed state, control is realized as shown in FIG. 2.

Namely, in a state where the rear clutch 109 is operating, the TCU controls the first and second shift control solenoid valves 47 and 49 such that hydraulic pressure is supplied from the first shift control valve 35 to the second and third speed pressure lines 51 and 53.

The third speed pressure supplied to the third speed pressure line 53 is supplied to the 2-3/4-3 shift valve 71 to move the valve spool 105 of the same to the right such that the lines 79 and 103 are communicated.

Simultaneously with the above, the TCU duty controls the pressure control solenoid valve 63 to operate the first pressure control valve 39 such that hydraulic pressure supplied to the line 43 is duty controlled and supplied to the servo apply 73 through the lines 79 and 103, and supplied to the servo release 99 and the front clutch 101 through the lines 79 and 103, communicated through the 2-3/4-3 shift valve 71, such that the kickdown band brake 72 is released and the front clutch 101 is operated, to realize shifting into the third speed of the drive D range.

After the above shifting, the TCU duty controls the third shift control solenoid valve 59 such that hydraulic pressure supplied to the line 57, branched off from the second speed pressure line 51, is applied to the second shift control valve 61 to operate the same.

Accordingly, the lines 127, 129, and 131 are mutually communicated. As a result, hydraulic pressure supplied to the line 129 moves the valve spool 97 of the end clutch valve 89 to the left such that hydraulic pressure supplied to the third speed pressure line 53 is fed to the line 93 to operate the end clutch 91, then hydraulic pressure supplied to the lines 127 and 131 is exhausted through the second shift control valve 61.

(3-4 Shifting)

Figure 3:
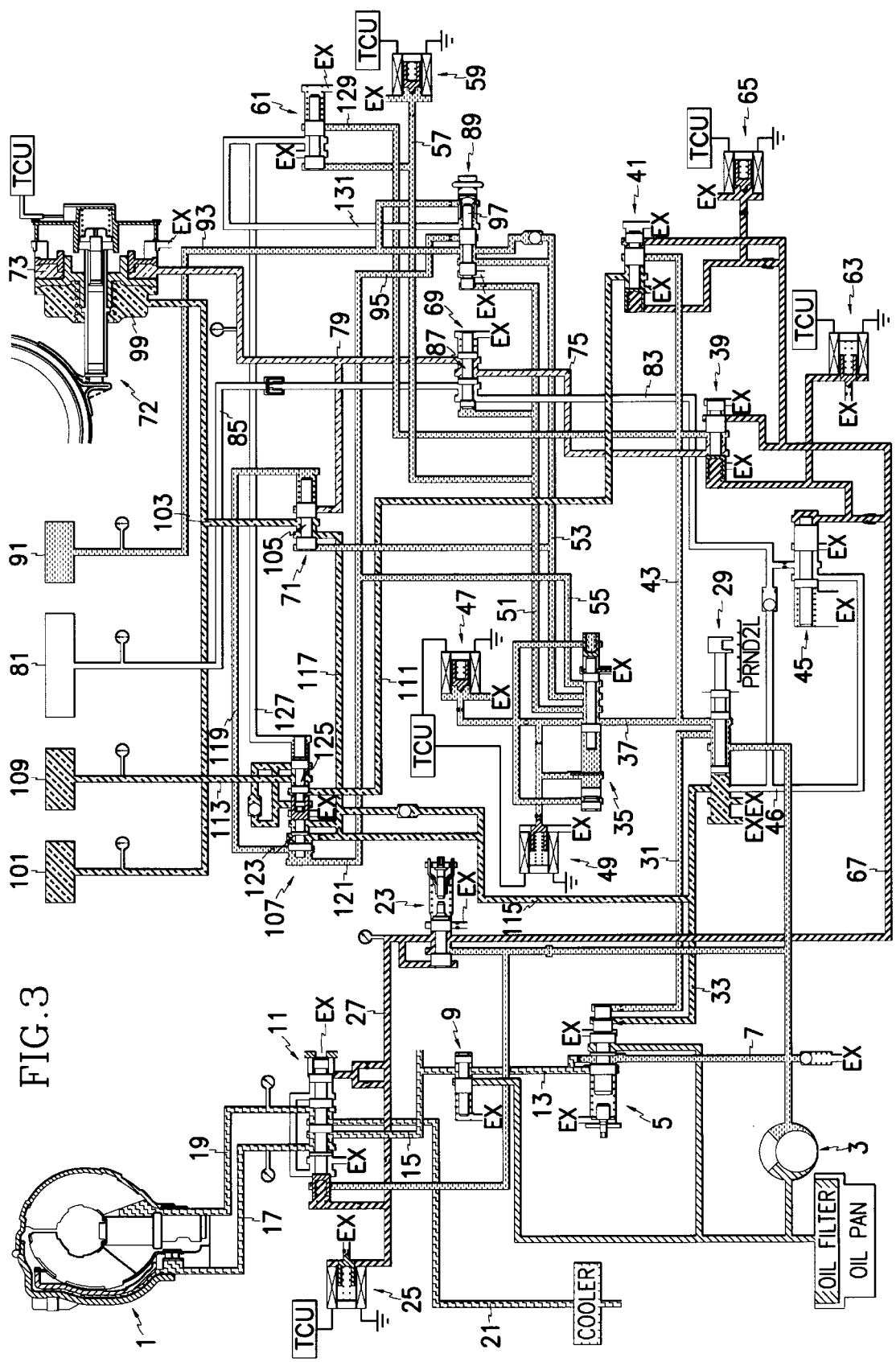
FIG. 3. is a hydraulic circuit diagram showing hydraulic pressure flow during 3-4 shift process of a hydraulic control system according to a preferred embodiment or the present invention.

If vehicle speed and throttle opening are increased in the second speed state, control is realized as shown in FIG. 3. Namely, in a state where the end clutch 91 is operating, the TCU controls the first, second and third shift control solenoid valves 47, 49 and 59 such that hydraulic pressure is supplied from the first shift control valve 35 to the second, third, and fourth speed pressure lines 51, 53, and 55.

The hydraulic pressure supplied to the second and third speed pressure lines 51 and 53 operates as in the third speed, while the fourth speed pressure supplied to the fourth speed pressure line 55 is supplied to the end clutch valve 89 via the line 95 such that hydraulic pressure is continuously supplied to end clutch 91 of the end clutch valve 89. Also, the hydraulic pressure is supplied to the rear clutch valve 107 via the line 121 to move the valve spools 123 and 125 of the valve 107 to the right such that the lines 119 and 121 are connected, while the connection between the line 111 and 113 is cut off.

The fourth speed pressure fed to the communicated lines 121 and 119 is supplied to the 2-3/4-3 shift valve 71 to move the valve spool 105 of the same to the left such that the lines 103 and 117 are communicated, while the communication between the lines 79 and 103 is blocked.

Accordingly, the hydraulic pressure operating the rear clutch 109 is exhausted through the line 113 and the rear clutch valve 107, and the hydraulic pressure supplied to the front clutch 101 and the servo release 99 is exhausted through the manual valve 29 via the lines 117 and 115, in which there are disposed orifices, such that the rear clutch 109 and the front clutch 101 are disengaged.

Simultaneously with the above, the TCU duty controls the second pressure control solenoid valve 65 to operate the second pressure control valve 41 such that exhaust hydraulic pressure in the line 111 is exhausted to the second pressure control valve 41.

Further, the TCU duty controls the first pressure control solenoid valve 63 to operate the first pressure control valve 39. As a result, hydraulic pressure supplied to the line 43 is supplied to the servo apply 73 through the lines 75 and 79, communicated through the 1-2 shift valve 69, such that the kickdown band brake 72 is engaged, realizing shifting into the fourth speed of the drive D range.

(4-3 Shifting)

Figure 4:
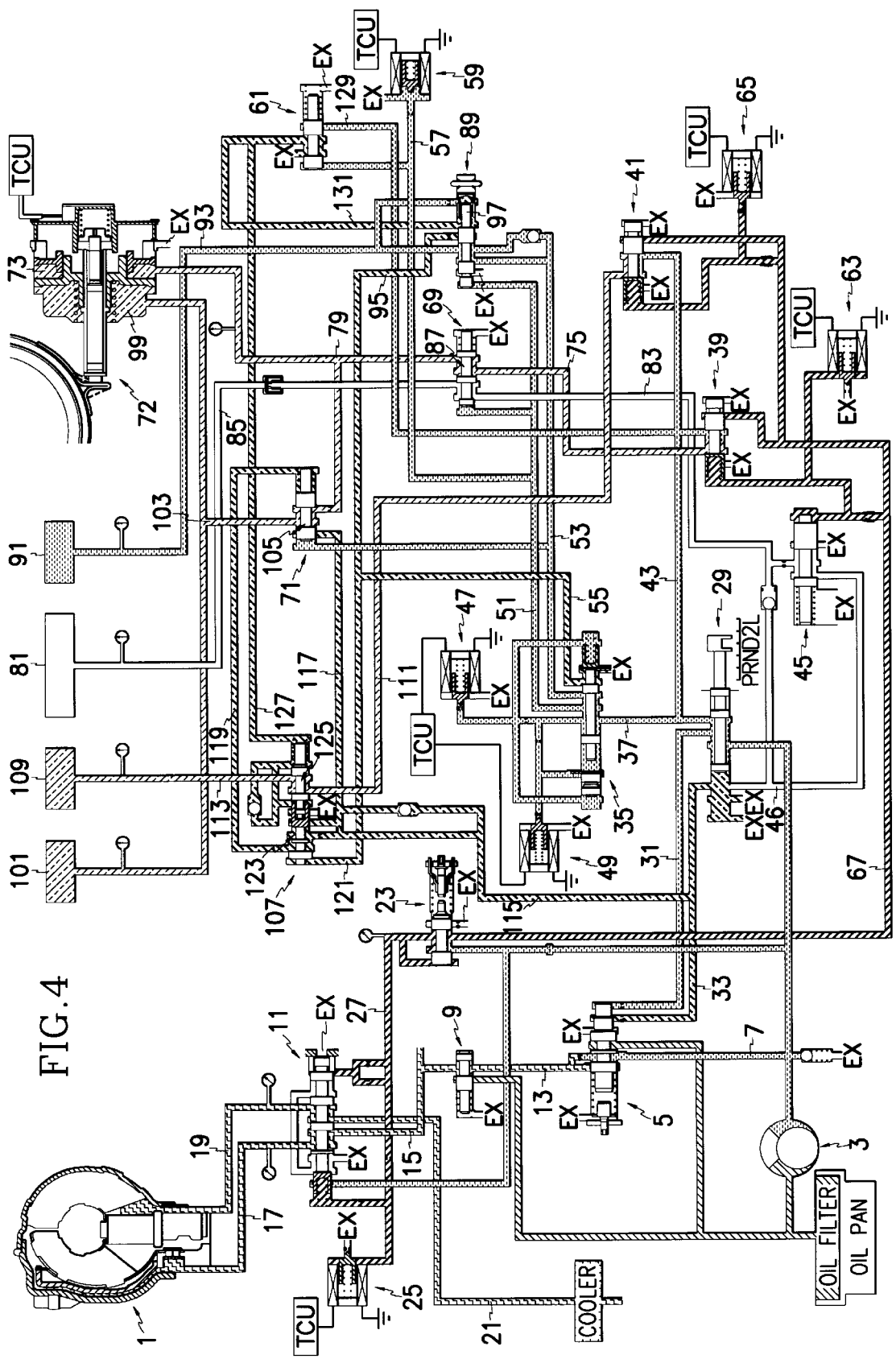
FIG. 4. is a hydraulic circuit diagram showing hydraulic pressure flow during 4-3 shift process of a hydraulic control system according to a preferred embodiment of the present invention.

In the above fourth speed state, if vehicle speed and throttle opening are reduced, control is realized as shown in FIG. 4. Namely, in a state where the end clutch 91 operating, the TCU controls the first and second shift control solenoid valves 47 and 49 such that hydraulic pressure supplied to the fourth speed pressure line 55 from the first shift control valve 35 is cut off.

Accordingly, pressure supplied to the lines 121, 95 and 55 is exhausted through the first shift control valve 35, and, as a result, the first valve spool 123 of the rear clutch valve 107 is moved to the left and the hydraulic pressure supplied to the lines 119 and 117 are exhausted through the manual valve 29 after passing through the line 115.

Here, the TCU controls the third shift control solenoid valve 59 to operate the second shift control valve 61. Accordingly, hydraulic pressure supplied to the line 129 is fed to the line 127 such that the second valve spool 125 of the rear clutch valve 107 is moved to the left.

In the above state, the TCU controls the first pressure control solenoid valve 63 to operate the first pressure control valve 39 such the hydraulic pressure is supplied to the servo apply 73 and the servo release 99 through the lines 43, 75, and 79 and the line 103, all communicating with the first pressure control valve 39, and hydraulic pressure is supplied to the front clutch 101 to operate the same.

After the above, the TCU controls the second shift control solenoid valve 65 to operate the second pressure control valve 41 such that hydraulic pressure is supplied to the rear clutch 109. As a result, the rear clutch 109 is operated to realize shifting into the third speed.

Meanwhile, when the vehicle is temporarily stopped after being driven, the lines 43 and 111 are cut off by the second pressure control valve 41 and the second valve spool 125 of the rear clutch valve 107 moves to the right such that the front clutch 101 and the servo release 99 receive hydraulic pressure. After shifting is completed through the above control, hydraulic pressure is supplied to the rear clutch 109 to operate the same.

(3-2 shifting)

Figure 5:
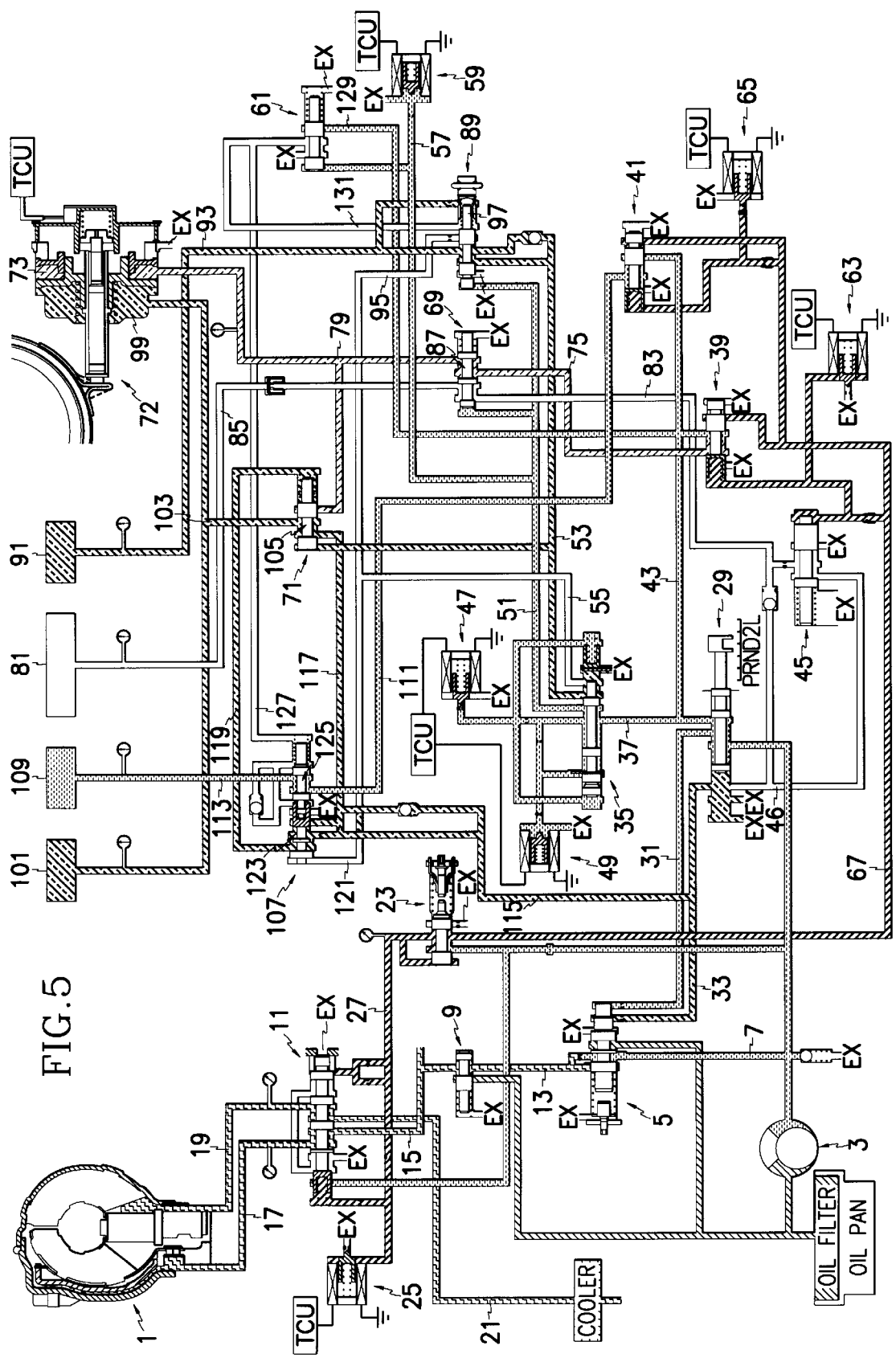
FIG. 5. is a hydraulic circuit diagram showing hydraulic pressure flow during 3-2 shift process of a hydraulic control system according to a preferred embodiment of the present invention.

In the above third speed state, if vehicle speed and throttle opening are reduced, control is realized as shown in FIG. 5. Namely, in a state where the rear clutch 109 is operating, the TCU controls the first, second and third shift control solenoid valves 47, 49 and 59 such that hydraulic pressure supplied to the third speed pressure line 53 from the first shift control valve 35 is cut off.

Accordingly, pressure supplied to the line 53 is exhausted through the first shift control valve 35, and, as a result, the valve spool 105 of the 2-3/4-3 shift valve 71 is moved to the left to cut off the lines 79 and 103, and communicate the lines 103 and 117.

As a result, the hydraulic pressure operating the front clutch 101 and the servo release 99 is exhausted through the manual valve 29 after passing through the lines 103 and 117, and the line 115, provided with an orifice.

Here, the TCU controls the first pressure control solenoid valve 63 such that the first pressure control valve 39 is operated and hydraulic pressure is supplied to the servo apply 73 via the lines 43, 75, and 79, communicated through the 1-2 shift valve 69, to engage the kickdown band brake 72, realizing shifting into the second speed.

(2-1 Shifting)

Figure 6:
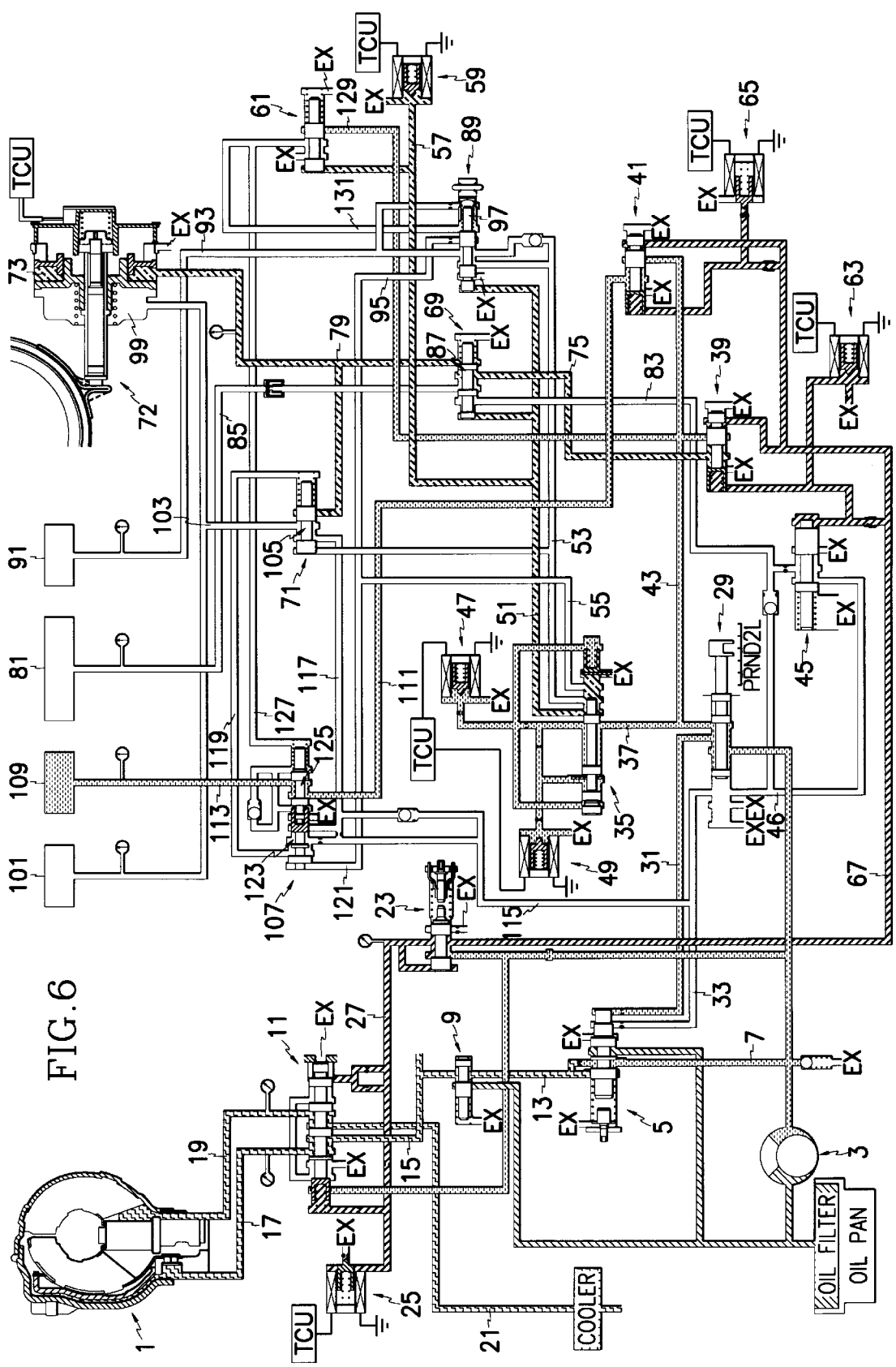
FIG. 6. is a hydraulic circuit diagram showing hydraulic pressure flow during 2-1 shift process of a hydraulic control system according to a preferred embodiment of the present invention.

In the above second speed state, if vehicle speed and throttle opening are reduced, control is realized as shown in FIG. 6. Namely, in a state where the rear clutch 109 is operating, the TCU controls the first, second and third shift control solenoid valves 47, 49 and 59 such that hydraulic pressure supplied to the second speed pressure line 51 from the first shift control valve 35 is cut off.

Accordingly, hydraulic pressure supplied to the line 51 is exhausted to the first shift control valve 35, and as a result, the valve spool 87 of the 1-2 shift valve 69 and the valve spool 97 of the end clutch valve 89 move to the left such that the communication between the lines 75 and 79 is cut off. Also, the TCU duty controls the first pressure control solenoid valve 63 to operate the first pressure control valve 39 such that the communication between the lines 75 and 43 is cut off. As a result, the hydraulic pressure operating the servo apply 73 is exhausted to the first pressure control valve 39 through lines 79 and 75 to release the kickdown band brake 72, realizing shifting into the first speed.

(D2-L Shifting)

Figure 7:
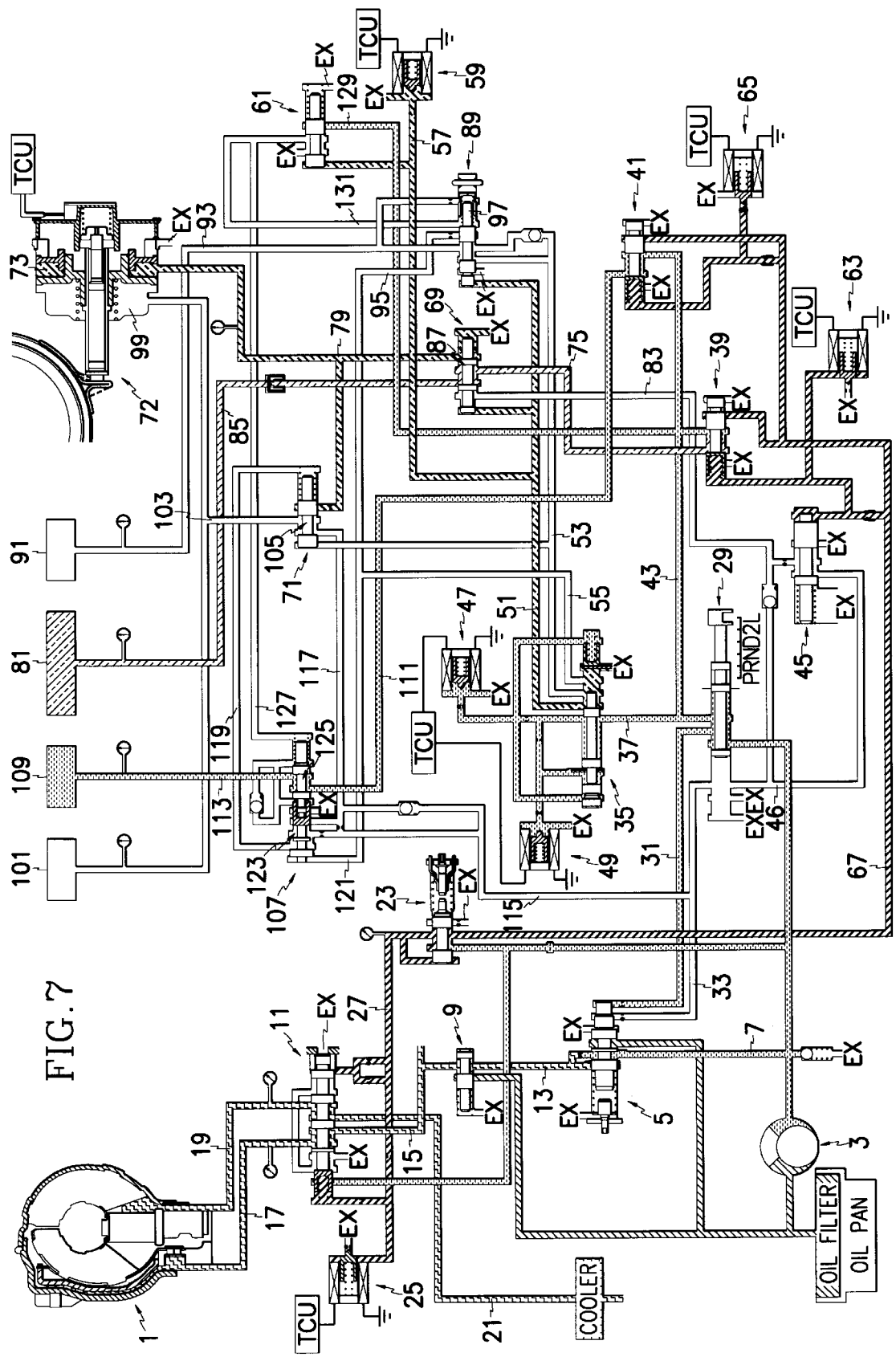
FIG. 7. is a hydraulic circuit diagram showing hydraulic pressure flow during D2-L shift process of a hydraulic control system according to a preferred embodiment of the present invention.

In the previously-described second speed state of the drive D range, control is realized as shown in FIG. 7. Namely, the manual valve 29 realizes port conversion such that hydraulic pressure supplied to the line pressure passage 7 is fed to the lines 37 and 43.

Also, in a state where the rear clutch 109 is engaged, the TCU controls the first, second and third shift control solenoid valves 47, 49 and 59 such that hydraulic pressure supplied to the second speed pressure line 51 from the first shift control valve 35 is cut off.

Accordingly, hydraulic pressure to the line 51 is exhausted through the first shift control valve 35. As a result, the valve spool 87 of the 1-2 shift valve 69 and the valve spool 97 of the end clutch valve 89 are moved to the left to cut off the connection between the lines 75 and 79.

Further, the TCU duty controls the first pressure control solenoid valve 63 to operate the first pressure control valve 39 such that the lines 43 and 75 are communicated.

Accordingly, the hydraulic pressure operating the servo apply 73 is exhausted through the line 79 and the 1-2 shift valve 69 to disengage the kickdown band brake 72. Further, the hydraulic pressure supplied through the communicated lines 43 and 75 is supplied to the low-reverse brake 81 via the line 85, realizing shifting into a first speed of the low L range.

(N-D2 Shifting)

Figure 8:
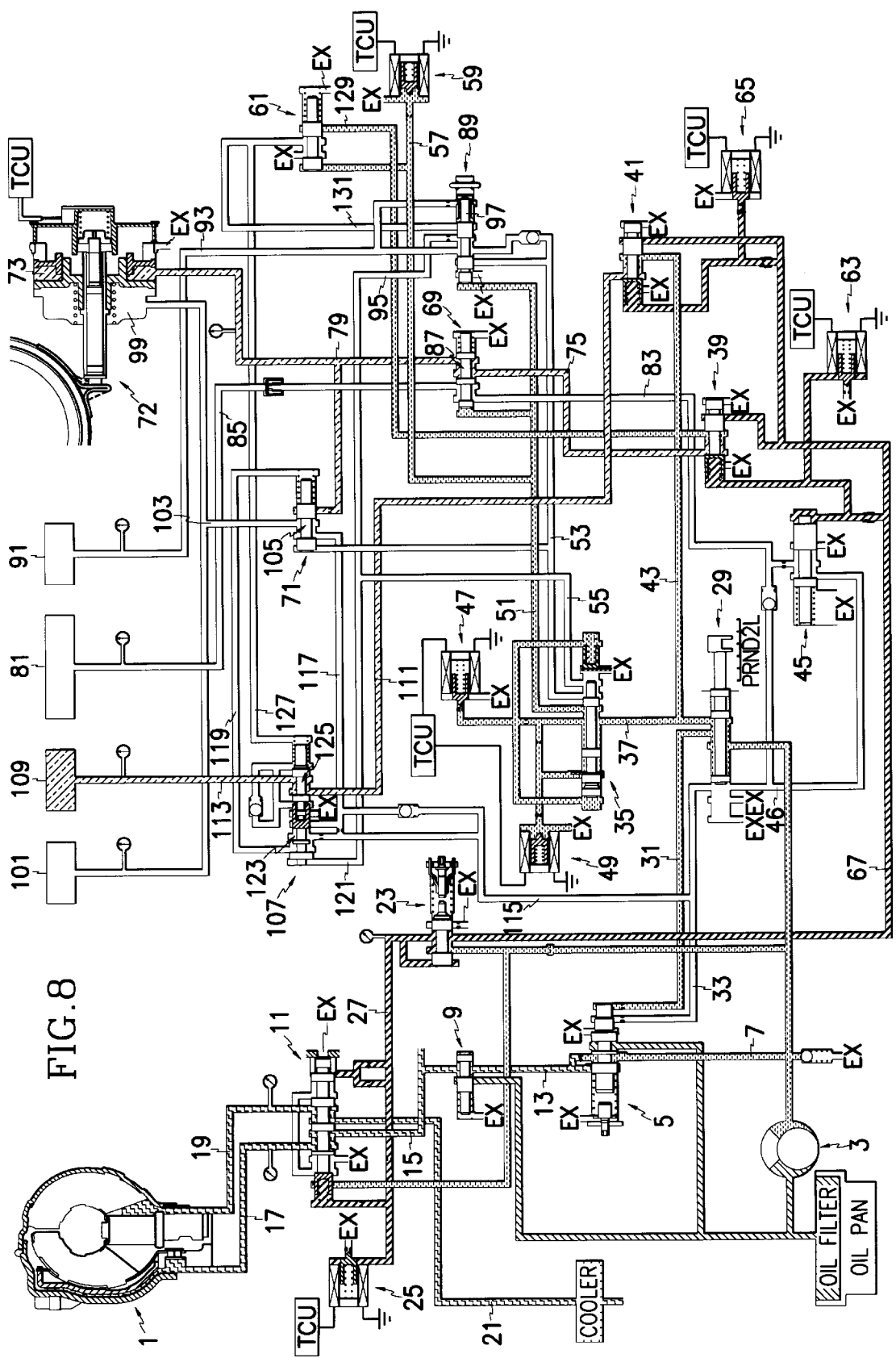
FIG. 8. is a hydraulic circuit diagram showing hydraulic pressure flow during N-D2 shift process of a hydraulic control system according to a preferred embodiment of the present invention.

From the neutral N range, in a state where the accelerator is not depressed if the shift lever is positioned at the drive D range by the driver, hydraulic flow occurs as shown in FIG. 8. Namely, the manual valve 29 undergoes port conversion such that hydraulic pressure supplied to the line pressure passage 7 is supplied to the lines 37 and 43.

Further, the TCU controls the first, second and third shift control solenoid valves 47, 49 and 59 such that hydraulic pressure is supplied to the second pressure line 51 of the first shift control valve 35.

Hydraulic pressure supplied to the second pressure line 51 is supplied to the 1-2 shift valve 69 to move the valve spool 87 of the same to the right such that communication with the lines 75 and 79 is realized. At the same time, the TCU duty controls the first pressure control solenoid valve 63 to operate the first pressure control valve 39 such that hydraulic pressure supplied to the line 43 is supplied to the servo apply 73 via the lines 75 and 79 to operate the kickdown band brake 72.

Further, the TCU duty controls the second pressure control solenoid valve 65 to operate the second pressure control valve 41 such that hydraulic pressure is supplied to the rear clutch 109 through the lines 43, 111, and 113, realizing shifting into the second speed of the drive D range.

In the hydraulic control system for an automatic transmission structured and operating as in the above, a second shift control valve 61 additionally supplies the hydraulic pressure from the first pressure control valve 39 to the rear clutch valve 107 and the end clutch valve 89 to assist the first shift control valve 35 and further, the second shift valve 61 is controlled by the solenoid valve 59 according to the TCU. As a result, the hydraulic control system accurately controls timing when hydraulic pressure is supplied from the hydraulic distributor to each friction element and reduces a change in hydraulic pressure levels in the hydraulic flow path. Accordingly, shift responsiveness and durability of the automatic transmission are improved.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A hydraulic control system for an automatic transmission including a plurality of friction elements associated with respective transmission speeds, the hydraulic control system comprising:

a hydraulic fluid source;

line pressure control means for regulating hydraulic pressure from said hydraulic fluid source to line pressure;

reducing pressure control means for reducing hydraulic pressure from said line pressure control means;

range control means for selectively supplying hydraulic pressure from said line pressure control means;

shift control means for supplying hydraulic pressure from said range control means to lines corresponding to the respective transmission speeds by control of a transmission control unit, said shift control means having a first shift control valve for controlling the hydraulic pressure from said range control means to second, third, and fourth speed pressures;

hydraulic pressure control means for converting hydraulic pressure from said range control means to operational pressure operating the friction elements; and hydraulic pressure distributing means for determining a hydraulic flow path corresponding to the respective transmission speeds according to the hydraulic pressure from said shift control means, and suitably distributing the operational pressure to each friction element said shift control means further comprising a second shift control valve for additionally supplying the hydraulic pressure from said range control means to said hydraulic pressure distributing means to control timing when hydraulic pressure is supplied from said hydraulic pressure distributing means to each friction element and reducing a change in hydraulic pressure levels in the hydraulic flow path, and a solenoid valve for controlling said second shift control valve under control of said transmission control unit.

2. The hydraulic control system of claim 1, wherein said second shift control valve comprises:

a first port for supplying hydraulic pressure to said hydraulic pressure distributing means;

a second port receiving hydraulic pressure from said range control means; and a third port connected to said solenoid valve.

3. The hydraulic control system of claim 2, wherein said third port connected to said solenoid valve for controlling said second shift control valve is further connected to a line connected to said first shift control valve to receive second speed pressure.

4. The hydraulic control system of claim 2, wherein said hydraulic pressure distributing means comprises a rear clutch valve and an end clutch valve, the first port of said second shift control valve being simultaneously connected to said rear clutch valve and said end clutch valve.

5. The hydraulic control system of claim 2, wherein said hydraulic pressure control means comprises first and second pressure control valves, the second port of said second shift control valve being connected to said first pressure control valve.

6. A hydraulic control system for an automatic transmission comprising:

a range controller for selectively supplying regulated hydraulic pressure;

a shift controller for supplying hydraulic pressure from said range controller to lines corresponding to respective transmission speeds;

a hydraulic pressure controller for converting hydraulic pressure from said range controller to operational pressure for operating transmission friction elements; and a hydraulic pressure distributor for determining a hydraulic flow path corresponding to the hydraulic pressure from said shift controller and distributing the operational pressure to each transmission friction element, said shift controller including a first shift control valve for controlling the hydraulic pressure from said range controller to plural speed pressures, a second shift control valve for supplying the hydraulic pressure from said range controller to said hydraulic pressure distributor to control timing when hydraulic pressure is supplied from said hydraulic pressure distributor to each transmission friction element, and a solenoid valve for controlling said second shift control valve.

7. The hydraulic control system of claim 6, wherein said second shift control valve comprises:

a first port for supplying hydraulic pressure to said hydraulic pressure distributor;

a second port receiving hydraulic pressure from said range controller; and a third port connected to said solenoid valve.

8. The hydraulic control system of claim 7, wherein said third port connected to said solenoid valve for controlling said second shift control valve is further connected to a line connected to said first shift control valve to receive a second of the plural speed pressures.

9. The hydraulic control system of claim 7, wherein said hydraulic pressure distributor comprises a rear clutch valve and an end clutch valve, the first port of said second shift control valve being simultaneously connected to said rear clutch valve and said end clutch valve.

10. The hydraulic control system of claim 7, wherein said hydraulic pressure controller comprises first and second pressure control valves, the second port of said second shift control valve being connected to said first pressure control valve.

11. The hydraulic control system for claim 6, wherein said plural speed pressures comprise second, third and fourth speed pressures.

12. The hydraulic control system of claim 6, wherein said second shift control valve also reduces a change in hydraulic pressure levels in the hydraulic flow path.

* * * * *